June 23, 1964     R. R. CHARBONNEAU     3,138,517
METALIZED LAMINATE
Filed May 27, 1960
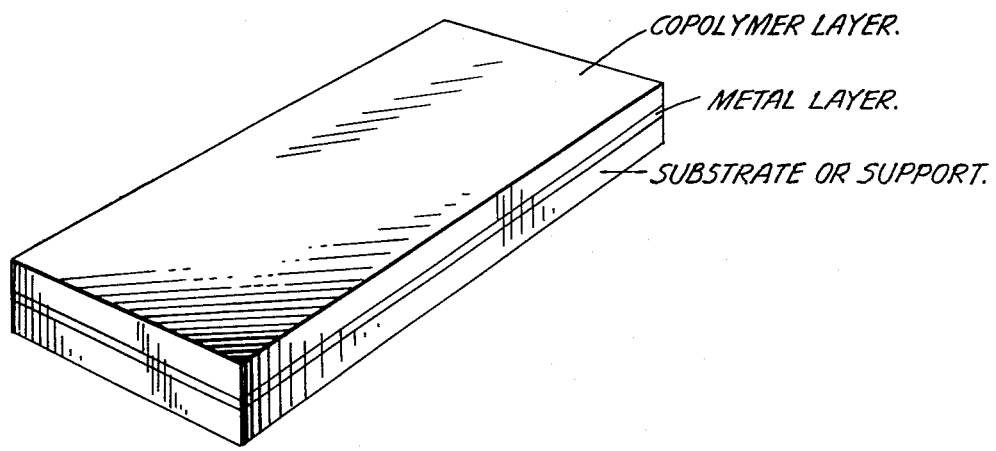
COPOLYMER LAYER.
METAL LAYER.
SUBSTRATE OR SUPPORT.
INVENTOR.
ROBERT R. CHARBONNEAU
BY
Carpenter, Abbott, Coulter & Kinney
ATTORNEYS 3,138,517
METALIZED LAMINATE
Robert R. Charbonneau, St. Paul, Minn., assignor to Minnesota Mining and Manufacturing Company, St. Paul, Minn., a corporation of Delaware
Filed May 27, 1960, Ser. No. 32,101
10 Claims. (Cl. 161—190)

This invention relates to a new metalized laminate. In one aspect this invention relates to a new reflective laminate. In still another aspect this invention relates to articles of manufacture made from a new metalized laminated fabric. This application is a continuation-in-part of my prior and copending application Serial No. 847,102, filed October 19, 1959, now abandoned.

The use of reflective materials in reflecting radar waves and heat waves is known in the art. Metalized surfaces, such as fabrics, paper, etc., have been extensively used for reflecting radar and heat waves. However, the environments in which such laminates are used result in weathering or abrasion of the metalized surface. In order to protect the metalized surface it has been suggested that resins be coated upon the surface. However, such coatings interfere with the transmission of the waves therethrough to the metalized surface, thereby reducing the efficiency of such surfaces for the purposes intended. Moreover, many such surfaces require flexibility and impermeability. This requires that the resin be elastomeric or flexible. Many of the resins suggested do not possess these characteristics suitable for use on flexible and impermeable surfaces.

It is an object of this invention to provide a new reflective laminate.

Another object of this invention is to provide articles of manufacture made from a new reflective laminate.

Still another object of this invention is to provide a new reflective laminate which is flexible and impermeable and may be used as an inflatable article.

Yet another object of this invention is to provide a metalized surface which is highly efficient for reflecting radar and heat waves and in which is abrasion resistant, weather resistant and lightweight.

Various other objects and advantages will become apparent to those skilled in the art from the accompanying description and disclosure.

In accordance with this invention, it has been found that polymers of polyalkylenamides transmit radar and heat waves with high efficiency. In the case of radar waves, the transmission is at least 95 percent, often higher than 98 percent. Accordingly, such polymers are utilized in this invention as a protective surface over a metalized (elemental metal) surface. Examples of such surfaces are metalized surfaces of textile fabrics, plastic self-supporting films or sheets, pulp wood and rag paper and wood. Examples of suitable fabrics include synthetic textile fabrics of Dacron (an ethylene glycol-terephthalic acid copolymer), Nylon (a diamine-dibasic acid copolymer), and Orlon (polyacrylonitrile). Other fabrics include those of cotton, wool and fiberglass. The fabrics may be in the form of random mat or woven material. Dacron and Nylon are preferred textile fabrics because of their dimensional stability, strength and low water absorption.

The accompanying drawing shows the laminate of the present invention comprising successive overlying layers of a substrate or support, a metal layer and a copolymer layer comprising a polyester and a polyalkylenamide. The various layers as shown in the drawing are bonded together to form a unitary system.

The elemental metal is placed upon the fabric, plastic film, paper or wood by various techniques known to those skilled in the art. Examples of such techniques include chemical deposition of a metallic salt by reaction with a reducing agent, such as the reaction of silver nitrate or copper nitrate with acetaldehyde to produce an elementary silver or copper surface on the substrate. Other methods include vapor deposition of a metal on a surface in a vacuum; the lamination of metal foil, such as aluminum, on the surface, such as a plastic film or paper; metal transfer by means of an adhesive and electrolytic deposition of a metal. Chemical deposition of the metal layer has shown much superior results for reflectance when the substrate is flexible, such as a woven fabric. Examples of suitable metalized surfaces include woven Dacron fabric in which silver or copper has been chemically deposited thereon, a homogeneous self-supporting film of cellulose acetate upon which aluminum has been deposited by vapor deposition in a vacuum, and a laminate of aluminum foil and wood pulp paper. The protective surface of polymerized polyalkylenamide is preferably an elastomeric or rubbery copolymer of the polyalkylenamide with a carboxyl- or hydroxyl-containing polyester adduct or prepolymer having a molecular weight between about 1,000 and 10,000 (a polyester polymer having more than two but usually not more than 15 active hydrogens per molecule). A protective coating thickness of 0.5 to 10 mils is satisfactory in most instances.

The polyalkylenamides of this invention, which are preferred to produce the polymer coating, may be represented by the following formula:

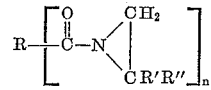

wherein R is an n-valent organic radical having 4 to 55 carbon atoms, for example, a hydrocarbon radical such as an acyclic alkylene radical or an arylene radical (for example, the 1,3-phenylene radical and the 1,4-phenylene radical), or an aryline radical such as the 1,3,5-phenyline radical; R' and R" each represent hydrogen or an alkyl radical, i.e. having from 1 to 8 carbon atoms; and $n$ is 2 to 4, preferably 2 to 3.

Among the N,N'-bis-1,2,-alkylenamides useful as curing agents in accordance with the invention are N,N'-bis-ethylene adipamide, N,N'-bis-ethylenisosebacamide; N,N' - bis - 1,2 - butylenisosebacamide; N,N' - bis-ethylensebacamide; N,N' - bis - ethylensuberamide; N,N'-bis-1,2-propylensuberamide; N,N'-bis-1,2 - butylensuberamide; N,N'-bis-ethylenazelaamide; N,N'-bis-1,2,-propylenazelaamide; N,N'-bis-1,2-butylenazelaamide; N,N'-bis-ethylendodecanoyldicarboxylic acid amide; N,N'-bis-ethylentetradecanoyldicarboxylic acid amide; N,N'-bis-1,2-propylentetradecanoyldicarboxylic acid amide; N,N'-bis-ethylenhexadecanoyldicarboxylic acid amide; N,N'-bis-ethylenoctadecanoyldicarboxylic acid amide; N,N'-bis - 1,2 - propylenoctadecanoyldicarboxylic acid amide; N,N'-bis-1,2-propylendodecanoyldicarboxylic acid amide; N,N'-bis-ethylenisophthalamide; N,N'-bis-1,2 - pentylensebacamide; N,N'-bis-1,2-butylenisophthalamide; N,N'-bis-1,2-propylenisophthalamide; N,N'-bis - 1,2 - pentylenisophthalamide; N,N' - bis - ethylenterephthalamide; N,N' - bis - 1,2 - propylenterephthalamide; N,N' - bis-1,2 - butylenterephthalamide; N,N',N" - tris - ethylenetrimesamide; etc. Mixtures of these monomers may be produced by employing mixed 1,2-alkylenimines in producing the monomers of the invention in accordance with the process of the invention.

The polyalkylenamide curing agents are prepared in monomeric form by the following two-phase process: an aqueous solution of an 1,2-alkylenimine, desirably containing not more than 10 carbon atoms, such as ethylenimine, 1,2-propylenimine, 1,2-butylenimine, 1,2-pentylenimine, etc., is reacted in the presence of an organic solvent at a temperature between —5 and 30° C. with an aliphatic polycarboxylic acid chloride containing 6 to 50 carbon atoms, such as adipoyl dichloride, isosebacoyl dichloride, sebacoyl dichloride, suberoyl dichloride, azelaoyl dichloride, tetradecanoyl dichloride, dodecanoyl dichloride, hexadecanoyl dichloride and octadecanoyl dichloride, isophthaloyl dichloride, terephthaloyl dichloride, and trimesoyl trichloride; to produce the desired substantially pure N,N'-bis-1,2-alkylenamide monomer, with hydrogen chloride as a by-product. The 1,2-alkylenimine is employed in a ratio of about 2 moles for each mol of acid chloride. Advantageously, an excess of 1,2-alkylenimine, such as about 5 percent by weight, over and above this ratio may be employed, although an excess of up to about 25 percent may be employed.

The polyester polymers of this invention may be prepared from a polyfunctional alcohol having at least 3 hydroxy groups, one or more diols and one or more dibasic acids by interaction at elevated temperatures, such as 150 to 200° C., in the presence of an esterification catalyst, preferably an acid catalyst. Some examples of these polyesters are the polymerization products of glycerol, 2,2-dimethyl-1,3-propanediol and succinic acid; trimethylolpropane, diethylene glycol, and adipic acid; trimethylolpropane, neopentyl glycol and diglycolic acid; glycerol, diethylene glycol, and adipic acid; trimethylolpropane, polyethylene glycol and thiadipropionic acid; trimethylolethane, diethylene glycol, polyethylene glycol and oxydipropionic acid; trimethylolpropane, 2,2-bis[4-(2-hydroxypropoxy)phenyl]propane and azelaic acid; mannitol, diethylene glycol and diglycolic acid; pentaerythritol, propylene glycol, sebacic acid, and isophthalic acid; and trimethylolpropane, 3-methyl - 3 - azapentandiol-1,5 and azelaic acid.

Polyester polymers may also be prepared from a polyfunctional acid containing at least 3 acid groups, one or more diols and one or more dibasic acids as above. Some examples of these polyesters are the polymerization products of trimesic acid, diethylene glycol and adipic acid; citric acid, polyethylene glycol and adipic acid; citric acid, di - 1,4-(2 - hydroxypropoxy)benzene, fumaric acid and sebacic acid; benzene tetracarboxylic acid, propylene glycol, 1,4-butylene glycol and adipic acid; benzene tetracarboxylic acid; polyethylene glycol, and maleic acid; and benzene tetracarboxylic acid; 2,2-diethyl 1,3-propanediol, and digylcolic acid.

A further method of preparing polyesters is by reacting a polyfunctional acid having at least 3 acid groups with a hydroxy or an amino acid under conditions set forth above. Some examples of these polyesters are the polymerization products of benzene tetracarboxylic acid and 1,2-hydroxy stearic acid; benzene tetracarboxylic acid and N-methyl β-alanine; polyacrylic acid and hydracrylic acid; polyacrylic acid and N-methyl-omega-aminoundecanoic acid; polymethacrylic acid and N-methyl-6-amino caproic acid.

As dianhydride-extended polyesters, some examples are the reaction products of a linear, hydroxyl-terminated polydiethylene glycol adipate extended with pyromellitic dianhydride; a linear, hydroxyl-terminated polyester of 1,4-butylene glycol and diglycolic acid extended with 1,4,5,8-naphthalenetetracarboxylic dianhydride; and a linear, hydroxyl - terminated polyester of polypropylene glycol and isophthalic acid extended with cyclohexanetetracarboxylic dianhydride.

The amount or proportion of the specific monomers of the initial reaction mixture is important to obtain the low molecular weight polyesters of the present invention which have on the average more than two active hydrogen groups (hydroxyl or carboxyl) appended to the chain. The major proportion of the functional groups in the reaction mixture provided by the monomers are other than the polyfunctional monomer (the monomer containing 3 or more functional groups, such as trimethylolpropane). In order to provide polyfunctional polyesters (i.e., containing a plurality of cross-linking sites) suitable for cross-linking to produce elastomers, between about 1 and about 10 percent of the functional groups of the reaction mixture are provided by the polyfunctional component containing at least three functional groups. The polyester polymers of the present invention preferably contain free carboxyl groups attached to the chain rather than hydroxyl groups since carboxyl groups are more active than hydroxyl groups.

In the preparation of the coatings of this invention, the polycarboxyl or polyhydroxyl group containing prepolymers are employed in liquid form, and if necessary may be warmed slightly to liquefy them. To the selected liquid polycarboxyl prepolymer is then added the bis-amide curing agent which is to be employed. While an amount of the bis-amide which is equivalent stoichiometrically to the number of active functional groups present may be employed, and some curing effect can be obtained with even smaller amounts, full cures are best effected when amounts greater than stoichiometric amounts are employed, ranging upwards from 10 to 100% greater; and it is ordinarily preferred that about 20 to 40% excess of the theoretical stoichiometric equivalent of the curing agent be used in order to compensate for any inerts in the curing agent, its adsorption on and reactivity with fillers, etc. The cure is initiated as soon as the two components are mixed. The rate of cure is dependent to a degree upon the temperature, the viscosity of the mixture and the amount of the curing agent which is employed. By maintaining the mixture at low temperatures, for example, about 0–10° C., the polymerization is retarded and increased pot life is obtained.

In other embodiments of this invention, the polymer of the polyalkylenamide may be prepolymerized and fabricated into a homogeneous impermeable film and then applied to the metalized surface or the unpolymerized polyalkylenamide may be admixed with the polyester prepolymer and applied to the surface as a solution and polymerized in situ upon the surface. Good results are achieved by placing the polyalkylenamide and polyester in solution, such as in an organic solvent; for example, toluene, and applying the solution to a surface and thereafter maintaining the solution at a temperature between about 20 and 150° C. for a sufficient length of time to form the polymer coating thereon.

The substrate may be coated on only one side with the metal layer and protective layer, or the substrate may be coated on both sides with the metal layer and protective layer wihout departing from the scope of this invention. Also, the substrate may be coated on only one side with the metal layer and on both sides with the protective coating.

The polymers of polyalkylenamides are flexible, weather resistant, abrasion resistant and impermeable in the form of homogeneous films or coatings.

Fillers, pigments and antioxidants may be included with the ingredients for producing the polyalkylenamide coating of this invention. These additives are those which will not interfere with the transmission of radar and heat waves. Typical examples of useful fillers and pigments include silica, calcium carbonate, iron oxide, carbon black, titanium dioxide, aluminum oxide, and stannic oxide. These materials impart increased strength and abrasion resistance to the coating. They also decrease the actinic light reflection from the surface which may be objectionable in some instances. The proportion of such additive used in the coating of the polymer of polyalkylenamide is between about 10 and about 50 parts of additive per 100 parts of polymer of the polyalkylenamide. Usually the antioxidant is used in somewhat less amounts, i.e. between about 1 and about 5 parts of antioxidant per 100 parts of polymer.

When the coating is applied by covering the surface with a solution of the ingredients, the curing or polymerization of the polyalkylenamide and the polyester may be conveniently effected at room temperature. This room temperature curing is particularly useful on fabrics and materials whose physical characteristic would be effected by high temperature cures. In the case of room temperature cures, the polyalkylenamide and the polyester are admixed just before application to the surface. In general, however, temperatures up to about 150° C. are suitable for curing the coating of the present invention. In the case of application of prefabricated films of the polymer of the polyalkylenamide and the polyester, the film is applied to the surface and heated to cause adherence thereto. Temperatures up to about 200° C. are useful for this purpose. The film may be adhered to the surface also by applying a thin layer of the uncured mixture of the polyalkylenamide and the polyester between the substrate and the film, followed by curing of the intermediate layer.

In view of the flexibility and impermeability of the polyalkylenamide-polyester copolymer coating of this invention, the coatings may be used on metalized fabrics for use in making inflatable objects or articles of manufacture, such as inflatable liferafts, weather balloons and inflatable aircraft. For example, the liferaft may be fabricated of metalized fiberglass or synthetic resin fabric coated with the polymer of the polyalkylenamide and the polyester. The coating imparts impermeability to the fabric and serves as a protective coating to the metalized surface. Thus, liferafts made of this material can be easily located by radar. Conventional liferafts are difficult to locate by radar. Weather balloons can be easily tracked by radar with such a laminate of the present invention. Inflatable and fabric covered airplanes have been proposed and are in use to some extent at this time. However, one of the difficulties in the use of such airplanes is that they cannot use guided radar approaches to airfields because the radar will not reflect from the fabric surface. The metalized surface of this invention for this purpose overcomes this difficulty and materially increases the safety and practicability of such type of small aircraft.

Wood lifeboats are also difficult to locate by radar. The application to the surface of the wood lifeboat of the laminate of the present invention enables the location and detection of such lifeboats by radar. Another use of the present laminate is in television and portable radar antennas. Such antennas made from the laminate of this invention are light weight and possess a metalized surface which is resistant to weathering with substantially no loss in efficiency of the antenna.

Another application of the laminate of this invention is in the reflection of heat waves. The metalized laminate is exceptionally useful in fire fighting clothing or apparel because of its light weight, durability and abrasion resistance. One of the difficulties in the past with such clothing is that the metalized surface is subjected to considerable amount of abrasion and handling as a result of which the metalized surface is damaged. The laminate of this invention effectively resists such abrasion with a minimum of decrease in efficiency in the reflection of heat waves. The same is true of frozen food wrappers. In this instance, paper is utilized as the wrapping material coated with a metal film or deposit. Such frozen food wrappers are utilized to prevent warming of the food after removal from the low temperature freezer. Here again, abrasion of the metalized surface is a serious problem. The coating of the metalized paper with the polymer of the polyalkylenamide and polyester has good low temperature properties and results in high abrasion resistance without a decrease in the efficiency of the insulating barrier.

Other uses of the metalized laminate of this invention are as coverings or shieldings for coaxial cables and electrical lead wires, and as wave guide tubing.

Copper and silver are preferred for use in guiding or reflecting radar waves while aluminum is preferred in reflecting heat waves with the laminate of this invention.

The following examples are offered as a better understanding of the present invention and its application, including preparation of the various components of the curable composition. The examples are not to be considered unnecessarily limiting to the present invention.

*Example I*

To a 2,000 ml. three-neck reaction flask equipped with a stirrer, a thermometer, a condenser and dropping funnel were added 110 grams of potassium carbonate, 800 grams of water and 43 grams of ethylenimine. The mixture was stirred until a solution was obtained which was then cooled to about 15° C. To the resulting solution was added dropwise with cooling and vigorous stirring a solution of about 95.6 grams of isosebacoyl dichloride prepared from "isosebacic acid" (a product of the U.S. Industrial Chemical Company consisting of 72–80% of 2-ethylsuberic acid, 12–18% of 2,4-diethyladipic acid and 6–10% of n-sebacic acid) dissolved in 400 ml. of diethyl ether. During this time the temperature of the mixture was maintained below 15° C. and the acid chloride added at a rate of approximately one gram per minute. The reaction mixture was allowed to warm gradually to room temperature, while stirring, for an additional hour. During the total reaction period, the pH of the reaction mixture dropped from approximately 12.5 at the beginning of the reaction to about 8.6 at the end. The ether layer was separated, dried over solid anhydrous sodium hydroxide at 0° C. for one hour, the sodium hydroxide removed by filtration and the ether removed from the filtrate under reduced pressure. The resulting reaction product, N,N'-bis-1,2-ethylenisosebacamide, remained as a water-white liquid. The yield was 93 grams or 93% of the theoretical. When subjected to analysis, the porduct was found to contain 10.8% nitrogen and 33.3% azirane radical as compared with the calculated values of 11.1% and 33.3%, respectively.

*Example II*

This example is a bulk preparation of a polyester of adipic acid, diethylene glycol and glycerol. About 146 grams (1.0 mol) of adipic acid, 85.5 grams (0.80 mol) of diethylene glycol, and 9.2 grams (0.10 mol) of glycerol were charged to a stirred 250 milliliter flask. The reaction mixture contained 5 percent excess of carboxyl groups over hydroxyl groups and 7.5 percent of these functional groups were provided by the glycerol. The reaction was carried out at 160–180° C. in a nitrogen atmosphere. The bulk of the water of esterification was removed (by distillation) within the first four hours and the remainder was then removed by lowering the pressure and raising the temperature of the reaction to 220° C. About two hundred grams of polymer were recovered. Its characteristics are as follows:

| | |
|---|---|
| Inherent viscosity in acetone | 0.08 |
| Acid number (milligrams of potassium hydroxide per gram of sample) | 58.0 |
| Number average degree of polymerization ($\bar{X}_n$) | 20 |
| Molecular weight ($\bar{M}_n$) (average) | 2000 |
| Free carboxyl groups per molecule (average) | 3.0 |
| Acid concentration (milli-equivalents per gram) | 1.04 |

*Example III*

This is an example of an azeotropic preparation of a saturated polyester of sebacic acid, neopentyl glycol and trimethylolpropane. About 202 grams (1.0 mol) of sebacic acid, 89.4 grams (0.9 mol) of neopentyl glycol and 3.7 grams (0.03 mol) of trimethylolpropane were charged to a flask which is fitted with a Barrett trap, a thermometer which is immersed in the liquid reaction mixture and a reflux condenser. The reaction mixture contained 5.2 percent excess of carboxyl over hydroxyl groups and approximately 2.5 percent of these functional groups were provided by the trimethylolpropane. A volume of benzene approximately equal to that of the reaction mixture was added and the liquid was heated to reflux. The refluxing was continued (the water of condensation being removed by the Barrett trap as it is formed) until the distillate becomes clear and the acid number of the polymer approached the theoretical value. The benzene was then removed by distillation. The characteristics of this polyester are as follows:

| | |
|---|---|
| Number average degree of polymerization ($\overline{X}_n$) | 23 |
| Free carboxyl groups per molecule (average) | 2.3 |
| Molecular weight ($\overline{M}_n$) (average) | 2500 |
| Acid concentration (milli-equivalents per gram) | 0.94 |
| Acid number | 53 |

*Example IV*

A 2 x 2 basket weave Dacron fabric under which has been chemically deposited a silver coating was treated with the following curable composition:

100 parts of branched polyester polymer of adipic acid and diethylene glycol, M.W.=2,000 (average), prepared according to Example II
25 parts of Ultra Sil VN-3 (silica)
20 parts of Titanox RANC (titanium dioxide)
25 parts of bis-ethylenisosebacamide
2 parts Flectol H (polymerized 1,2-dihydro-2,2,4-trimethylquinoline) antioxidant The coating was done as follows: The above mixture was paint-milled and diluted with toluene to about 70 weight percent of the above components and then coated onto the metalized fabric by dipping into a dip tank and passing between two steel bars to remove excess composition. After drying for 10 minutes at ambient temperature, the coating was heated to 150° C. for 10 minutes to affect the copolymerization or curing. Copolymerization could be accomplished at lower temperatures for a somewhat longer period of time. The resulting laminate was tough, rubbery, and highly abrasion resistant, and the coating had good adhesion to the fabric.

The above laminate was evaluated for reflectivity to radar frequency electromagnetic radiations and was found to have 98 percent reflectivity as compared to a solid brass plate.

*Example V*

A Dacron fabric coated with chemically deposited copper in which the coating admixture prior to curing had the following composition:

100 parts of branched polyester polymer of adipic acid and diethylene glycol (2,000 M.W.), prepared according to Example II
50 parts of Titanox RANC (titanium dioxide)
15 parts of Cab-O-Sil (silica)
2 parts of Agerite White, antioxidant (symmetrical di-beta-naphthyl-paraphenylene diamine)
25 parts of bis-ethylenisosebacamide The fabric was abrasion resistant, tough and had 95 percent reflection to radar frequencies.

*Example VI*

A Dacron fabric coated with chemically desposited copper in which the coating admixture prior to curing had the following composition:

100 parts of branched polyester polymer of neopentyl glycol and sebacic acid, M.W.=2,500–3,200, prepared according to Example III
15 parts of Cab-O-Sil (silica)
2 parts of Agerite White, antioxidant (symmetrical di-beta-naphthyl-paraphenylene diamine)
13 parts of bis-ethylenisophthalamide The fabric was abrasion resistant, tough and had 95.5 percent reflectivity to radar frequencies.

*Example VII*

A Dacron fabric coated with chemically deposited silver in which the coating admixture prior to curing had the following composition:

100 parts of branched polyester polymer of neopentyl glycol and sebacic acid (M.W. 2,500), prepared in accordance with Example III
15 parts of Cab-O-Sil (silica)
2 parts of Agerite White, antioxidant (symmetrical di-beta-naphthyl-paraphenylene diamine)
11 parts of bis-ethylenisophthalamide The fabric was abrasion resistant, tough and had 98.7 percent reflectivity to radar frequencies.

The polyester prepolymer of Examples IV and V possess branching equivalent to about 0.5 branch per average molecule. The polyester prepolymer of Examples VI and VII possess branching equivalent to about 0.7 branch per average molecule.

Laminates on fiberglass cloth, Nylon fabric, Orlon fabric, cotton cloth, woolen cloth, paper sheet, and wood made in a manner in accordance with Examples IV through VII show similar results.

Various techniques of combining and laminating the fabric may be practiced without departing from the scope of this invention. Also various additives which act as fillers, stabilizers and pigments may be utilized in the present coating and laminate without departing from the scope of this invention.

Having described my invention, I claim:

1. A metalized laminate comprising as successive overlying layers, a substrate, an intermediate layer comprising a metal, and a layer subsequent to said intermediate layer comprising a solid copolymer of a polyester containing more than two active hydrogens and having a molecular weight between about 1,000 and 10,000 and a polyalkylenamide of the formula

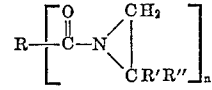

in which R is an n-valent organic radical having from 4 to 55 carbon atoms, R' and R'' are each selected from the group consisting of hydrogen and an alkyl radical having from 1 to 8 carbon atoms and $n$ is from 2 to 4, said substrate and layers being bonded together as a unitary structure.

2. The laminate of claim 1 in which said metal is silver.
3. The laminate of claim 1 in which said metal is copper.
4. The laminate of claim 1 in which said metal is aluminum.
5. A metalized laminate comprising as successive overlying layers, a substrate, an intermediate layer comprising an elementary metal, and a protective layer subsequent to said intermediate layer comprising a filler and a solid copolymer of a polyester containing more than two active hydrogens and having a molecular weight between about 1,000 and about 10,000 and a polyalkylenamide of the formula

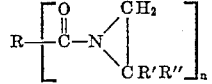

in which R is an n-valent organic radical having from 4 to 55 carbon atoms, R' and R'' are each selected from the group consisting of hydrogen and an alkyl radical having from 1 to 8 carbon atoms and $n$ is from 2 to 4, said substrate and layers being bonded together as a unitary structure.

6. A metalized flexible laminate comprising as successive overlying layers, a woven synthetic resin fabric substrate, an intermediate layer comprising a metal, and a layer subsequent to said intermediate layer comprising a solid copolymer of a polyester polymer containing more than two active hydrogens and having a molecular weight between about 1,000 and 10,000 and a polyalkylenamide of the formula

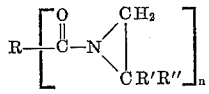

in which R is an n-valent organic radical having from 4 to 55 carbon atoms, R' and R'' are each selected from the group consisting of hydrogen and an alkyl radical having from 1 to 8 carbon atoms and $n$ is from 2 to 4, said substrate and layers being bonded together as a unitary structure.

7. A metalized flexible laminate comprising as successive overlying layers a paper substrate, an intermediate layer comprising a metal, and a protective layer subsequent to said intermediate layer comprising a solid copolymer of a polyester polymer containing more than two active hydrogens and having a molecular weight between about 1,000 and 10,000 and a polyalkylenamide of the formula

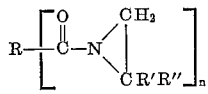

in which R is an n-valent organic radical having from 4 to 55 carbon atoms, R' and R'' are each selected from the group consisting of hydrogen and an alkyl radical having from 1 to 8 carbon atoms and $n$ is from 2 to 4, said substrate and layers being bonded together as a unitary structure.

8. A metalized flexible laminate comprising as successive overlying layers, a wood substrate, an intermediate layer comprising a metal, and a protective layer subsequent to said intermediate layer comprising a solid copolymer of a polyester polymer containing more than two active hydrogens and having a molecular weight between about 1,000 and 10,000 and a polyalkylenamide of the formula

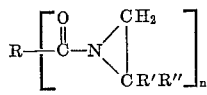

in which R is an n-valent organic radical having from 4 to 55 carbon atoms, R' and R'' are each selected from the group consisting of hydrogen and an alkyl radical having from 1 to 8 carbon atoms and $n$ is from 2 to 4, said substrate and layers being bonded together as a unitary structure.

9. A metalized flexible laminate comprising as successive overlying layers, a synthetic plastic film substrate, an intermediate layer comprising a metal, and a protective layer subsequent to said intermediate layer comprising a solid copolymer of a polyester polymer containing more than two active hydrogens and having a molecular weight between about 1,000 and 10,000 and a polyalkylenamide of the formula

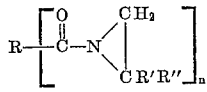

in which R is an n-valent organic radical having from 4 to 55 carbon atoms, R' and R'' are each selected from the group consisting of hydrogen and an alkyl radical having from 1 to 8 carbon atoms and $n$ is from 2 to 4, said substrate and layers being bonded together as a unitary structure.

10. A metalized laminate comprising as successive overlying layers, a Dacron substrate, an intermediate layer comprising chemically-deposited silver, and an outer protective layer comprising an inorganic filler, an antioxidant and a solid elastomeric copolymer of a polyester polymer containing more than two active hydrogens and having a molecular weight between about 1,000 and 10,000 and a polyalkylenamide of the formula

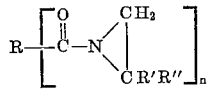

in which R is an n-valent organic radical having from 4 to 55 carbon atoms, R' and R'' are each selected from the group consisting of hydrogen and an alkyl radical having from 1 to 8 carbon atoms and $n$ is from 2 to 4, said substrate and layers being bonded together as a unitary structure.

References Cited in the file of this patent

UNITED STATES PATENTS

| | | |
|---|---|---|
| 2,439,983 | Morgan | Apr. 20, 1948 |
| 2,642,920 | Simon et al. | June 23, 1953 |
| 2,993,806 | Fisher et al. | July 25, 1961 |

FOREIGN PATENTS

| | | |
|---|---|---|
| 307,144 | Great Britain | Mar. 7, 1929 |
| 900,137 | Germany | July 8, 1949 |

OTHER REFERENCES

"Plastics" (October 1942), E. Halls, Fellers for Plastics (pp. 354 and 356 relied on).

Natural and Synthetic High Polymers, Meyer, Interscience Publishers, Inc., New York (1930), p. 210.